April 2, 1935.   L. McCONNELL   1,996,303
FISH BAG HOLDER
Filed March 24, 1933

Inventor
L. McConnell
By Young Young
Attorneys

Patented Apr. 2, 1935

1,996,303

UNITED STATES PATENT OFFICE 1,996,303

FISH BAG HOLDER

Lincoln McConnell, Racine, Wis.

Application March 24, 1933, Serial No. 662,502

1 Claim. (Cl. 248—20)

This invention appertains to fishing, and more particularly to novel means for receiving and holding the fish after they have been caught to retain them in a fresh and live condition, said means entirely eliminating the necessity of stringing the fish through the gills on lines and the like.

One of the primary objects of my invention is to provide a bag for receiving the fish after they have been caught with novel means for suspending the bag from the side of a boat, so that the bag will be firmly held against loss and whereby the lower end of the bag will be positioned in the water for the purpose of keeping the fish alive.

Another salient object of my invention is to provide a fish bag and a clamp for engaging the gunwhale of a boat, the bag being detachably associated with the clamp, so that the clamp can be left on the boat as a permanent part thereof, if so desired.

A further important object of my invention is the provision of an adjustable two-part clamp for gripping the gunwhale of a boat, the outer jaw of the clamp being provided with parallel openings for detachably receiving arms formed on the terminals of a hoop carrying the bag for receiving the fish, the arms being freely removable from said clamp, when so desired, to allow the bag and its hoop to be readily detached from the boat without disturbing the clamp, when it is desired to transport the bag and fish from the boat to a desired locality.

A further important object of my invention is the provision of means for retaining the hoop of a bag at an angle to the horizontal, so that any weight on the outer end of the bag will tend to set up resistance between the arms of the hoop and the walls of the openings formed in the jaw of the clamp, the jaw of the clamp being also provided with a thumb screw for positively engaging one of said arms.

A still further object of my invention is the provision of an improved fish holder of the above character, which will be durable and efficient in use, one that will be simple and easy to manufacture, and one which can be placed upon the market at a reasonable cost.

With these and other objects in view, the invention consists in the novel construction, arrangement and formation of parts as will be hereinafter more specifically described, claimed and illustrated in the accompanying drawing, in which drawing:—

Figure 1:
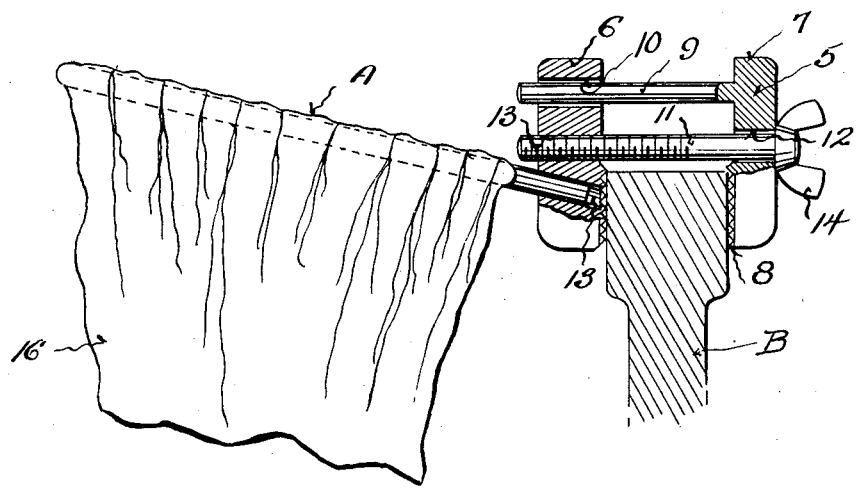
Figure 2:
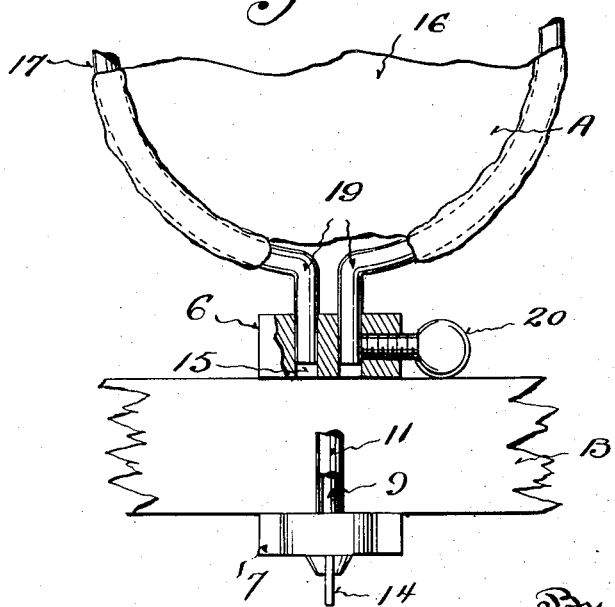

Figure 1 is a fragmentary side elevation of my improved fish holder, with parts of the clamp shown broken away and in section, the view showing the device connected to the gunwhale of a boat, the gunwhale being likewise shown in cross section; and Figure 2 is a fragmentary top plan view of my improved fish holder with parts thereof broken away and in section to illustrate structural details.

Referring to the drawing in detail wherein similar reference characters designate corresponding parts throughout the several views, the letter A generally indicates my improved device, and B a fragment of a boat with which my device can be associated.

The boat B forms no part of my present invention and only a fragment thereof has been illustrated to show how my device is connected therewith.

My improved fish holder comprises a clamp 5 including a pair of facing jaws 6 and 7. The inner surfaces of the jaws 6 and 7 adjacent to their lower ends are provided with serrated faces 8 for firmly gripping the opposite sides of the gunwhale of the boat. The jaw 7 has formed thereon or rigidly connected therewith a guide rod 9 which extends through a guide opening 10 formed in the jaw 6.

A clamping bolt 11 extends loosely through an opening 12 formed in the jaw 7 below the rod 9, and this bolt is in turn threaded into an opening 13 formed in the jaw 6 below the opening 10. This bolt can be provided with a wing, or other suitable type of head, 14 for permitting the convenient operation of said bolt, and this head is adapted to impinge against the outer surface of the jaw 7.

Obviously, upon the loosening of the bolt 11 the jaws 6 and 7 can be spread apart to permit the easy placing of the clamp on the boat after which the bolt 11 can be tightened for bringing the jaws into gripping contact with the gunwhale of the boat.

The jaw 6 is adapted to be arranged exteriorly of the boat and is provided with a pair of spaced parallel downwardly extending openings 15, for a purpose which will be later set forth.

In order to support and receive the caught fish a bag 16 of the desired capacity is provided. This bag can be formed of any desired material, such as canvas or netting, and the upper edge thereof can be secured about a hoop 17. The ends of the hoop 17 are provided with spaced parallel arms 19 which are freely insertible within the downwardly inclined openings 15.

By this construction the hoop can be removably connected with the clamp and after a day's fishing it is merely necessary to pull the arms 19 from out of engagement with the clamp, leaving the clamp in place on the boat.

To prevent the accidental displacement of the hoop from the clamp, I can provide a thumb screw 20 which can be threaded into the jaw 6 for impinging against one of the arms 19.

From the foregoing description it can be seen that I have provided an exceedingly simple and durable device for effectively supporting a fish bag from a boat for receiving the fish as the same are caught.

Changes in details may be made without departing from the spirit or the scope of this invention, but what I claim as new is:—

In a device for receiving caught fish, a clamp including a pair of adjustable jaws, one of said jaws embodying a solid block having a pair of spaced parallel downwardly inclined openings, a hoop including a resilient bow and a pair of parallel arms formed on the ends of the bow removably received in said openings, the arms and bow being disposed in the same plane, whereby the bow will be held at an angle to the horizontal when the arms are in the openings, and means carried by the block for binding engagement with one of said arms.

LINCOLN McCONNELL.